United States Patent Office 3,701,740
Patented Oct. 31, 1972

3,701,740
PROCESS FOR MAKING POLY(ARYLENE-VINYLENES)
James V. Crivello, Mechanicville, N.Y., assignor to General Electric Company
No Drawing. Filed Nov. 4, 1971, Ser. No. 195,833
Int. Cl. C08g 33/00
U.S. Cl. 260—2 H
9 Claims

ABSTRACT OF THE DISCLOSURE

Alkali metal adducts of hexa-substituted phosphoric triamides are improved dehydrohalogenating agents for making bright yellow fluorescent polymers by dehydrohalogenating, with a dehydrohalogenating agent under dehydrohalogenating conditions, a compound having at least two halomethyl groups substituted on an aryl nucleus in positions relative to each other so that the double bonds of the vinylene groups created by said dehydrohalogenating reaction are conjugated with one another through the double bonds of said aryl nucleus.

---

This invention relates to an improvement in the process wherein a dehydrohalogenating agent is used under dehydrohalogenating conditions to dehydrohalogenate the halomethyl groups of a compound containing at least two such halomethyl groups substituted on an aryl nucleus to produce a poly(arylenevinylene).

Some authors have proposed that the polymer forming reaction proceeds as follows, using 1,4-bis(chloromethyl)benzene for purposes of illustration only:

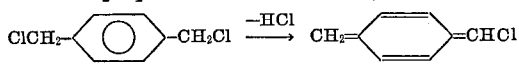

which then polymerizes to the polymer

A.
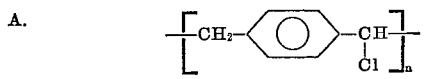

which can also be written as

B.
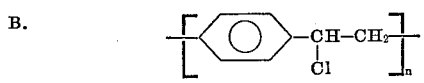

which on further dehydrohalogenation produces

C.
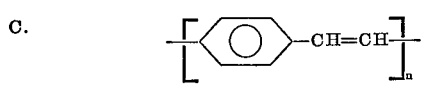

where $n$ is the average degree of polymerization, i.e., the average number of repeating units in the polymer.

Other authors view the polymer forming step as an intermolecular dehydrohalogenation reaction wherein hydrogen of one halomethyl group on one aryl nucleus and the halogen of one halomethyl group of another aryl nucleus are simultaneously removed as the hydrohalide, leading to polymers represented above by B, which likewise are further dehydrohalogenated to polymers represented above by C. By whatever mechanism, it is obvious that incomplete dehydrohalogenation can lead to polymers having both B and C units. In addition, dehalogenation can occur in the polymer reaction leading to polymer units having the formula:

D.
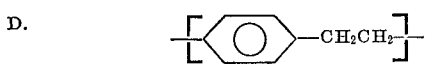

which are incapable of forming the unsaturated units found in polymer C. Brown et al., J. Chem. Soc. 1953, 3270, prepared a polymer having essentially all D units by reacting α,α′-dichloro-p-xylene with sodium metal in either excess of the dichloroxylene or in p-xylene.

When the double bonds of the vinylene (—CH=CH—) groups are conjugated with each other through the double bonds of the arylene group, the compounds are bright yellow and fluoresce under ultraviolet light with generally a very strong yellow color although this color may be shifted somewhat towards the red or green depending on various other substituents present on the arylene nucleus. The intensity of the fluorescence is increased by increasing the length of the unbroken chain of conjugation. Breaks in this chain can come from the presence of only one unit of B or D type, i.e., an ethylene or chloroethylene connecting two arylene groups. If there is only one such break, the polymer molecule would have two chains of conjugation. The ideal situation would be to have as high a molecular weight polymer as possible with only vinylene groups connecting the arylene groups.

It is obvious that in order for the unsaturation of the vinylene groups to be conjugated with each other through the unsaturation of the arylene group which separates them, that at least two halomethyl groups of the starting material must be substituted on the aryl nucleus in only certain positions relative to each other, i.e., 1,2- or 1,4- for benzenoid compounds, 1,2-, 1,4-, 1,5-, 1,7-, 2,6-, 2,8-, etc., for naphthalenoid compounds, 9,10- plus the same as the naphthalenoid for anthracenoid compounds etc. Preferably the positions are chosen which give the longest conjugated path through the arylene group, i.e., 1,4- is preferable to 1,2-, etc.

Many methods are disclosed in the art for the preparation of these fluorescent compounds. Drefahl et al., in Chem. Ber. 91, 1274 (1958) prepared various stilbenes and styryl substituted stilbenes to give oligomers having up to 4 repeating units. Those having at least 3 repeating units fluoresced yellow. These materials were prepared by various organic synthetic techniques and were soluble in ordinary solvents. McDonald et al., J. Am. Chem. Soc. 82, 4669 (1960), found that the Wittig reaction of p-xylylene - bis - (triphenylphosphoniumchloride) with terphthalaldehyde in the presence of lithium ethylate produced a polymer having formula C having up to 10 repeating units but the reaction apparently was not straightforward since the yield of 6.4 g. of initial product is the theoretical amount for this product II where $n=1$, i.e., the production of

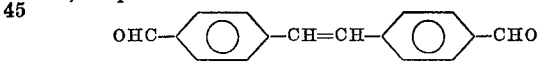

No yield of product is reported after extracting low molecular weight material to leave a product having an average value of $n=9$.

U.S. Pat. No. 3,110,687, Smith discloses a wide variety of poly(arylenevinylenes) prepared by dehydrochlorination of various aryl compounds dissolved in benzene or toluene having two or more halomethyl groups substituted with an alkali metal amide in liquid ammonia. No elemental analyses of the products are given but in a later appearing article, Polymer Letters 2, 697 (1964), Hoeg et al. studied the same reaction using tetrahydrofuran as the solvent and determined that the polymer from α,α′-dichloro-p-xylene contained an average of 12, 1,4-phenylene groups joined together by 10 vinylene groups and one chloroethylene group and had 2 aminomethyl end groups. Low molecular weight, high chlorine containing products (7–8 repeating units, >10% $Cl_2$) were obtained by Zidarov et al., Naturwissenschaften 52 (1) 13 (1965) when an ether solution of α,α′-dichloroxylene was added to either sodium amide or lithium amide in liquid ammonia.

Gilch et al., J. Polymer Science 4, 1337 (1966), reported on their study of dehydrohalogenation of various halogenated xylenes using alkali metal alkoxides. They appear to be the first ones to recognize that reaction conditions could determine the course of the reaction since they obtained an unsaturated polymer under normal conditions but with very dilute solutions obtained a white polymer which on heating or treatment with additional base, gave the bright yellow polymer with elimination of additional hydrogen chloride. Under the best conditions, the unsaturated products still contained 12.5% chlorine showing incomplete dehydrochlorination.

Horhold et al., Makromol Chem. 131, 105 (1970) compared the properties of the polymers, prepared both by the Wittig reaction and by dehydrochlorination using sodium hydride in dimethylformamide and also potassium amide in liquid ammonia. They also studied the effect of various substituents on the aryl nucleus. Other means of preparing these compounds are disclosed in U.S. Pats. Nos. 3,427,261, Meyer and 3,577,476, Gurney et al.

Because of their very strong fluorescence in the visible spectrum when exposed to ultraviolet light, these poly (arylenevinylenes) are very desirable as organic phosphors. They can be used in paints or dispersed in polymeric compositions to impart fluorescent properties to these compositions. As such, they have advantages over the inorganic phosphors since the latter compounds depend upon a particular crystal structure for the fluorescent properties and care must be taken in incorporating the latter in paints, plastics, etc., to ensure that the inorganic phosphor crystal structure is not destroyed by shearing or grinding during dispersion in the composition.

As mentioned previously, the poly(arylenevinylenes) owe their fluorescent properties to the fact that the double bonds of the vinylene groups are conjugated with each other through the double bonds of the arylene groups. In view of the side reactions enumerated above, occurring during the dehydrohalogenation reactions, Wittig reactions, etc., in preparing the poly(arylenevinylenes), there has been a wide variation in the fluorescent properties of the product. Only the Wittig reaction discussed above eliminates many of the side reactions but still produces some by-product and, furthermore, has the disadvantage that it requires 4 steps, more reagents, and the reagents are relatively expensive compared to the dehydrohalogenating reactions using only a dehydrohalogenating agent and α,α'-dichloro-p-xylene, sometimes called p-xylylene dichloride. However, as is evident above, these dehydrohalogenation reactions lead to interruption of the conjugation within a polymer molecule and some lead to relatively low molecular weight products, both such events having an adverse effect on the fluorescent properties of the product.

Unexpectedly, I have found that when the alkali metal adduct of a hexa-substituted phosphoric triamide is used in the dehydrohalogenating reaction that extremely high yields of a very low halogen content product is obtained which has extremely strong yellow fluorescence when exposed to ultraviolet light. This was indeed surprising since several workers who studied the use of alkali metal adducts of hexa-substituted phosphoric triamides had found that benzyl chloride was coupled to produce 1,2-diphenylethane rather than to produce stilbene as was accomplished by use of sodamide in liquid ammonia, see Fraenkel et al., J. Am. Chem. Soc. 87, 1306 (1965); Normant et al., Bull. Soc. Chem. 12, 3341 (1965); and Kharasch et al., J. Am. Chem. Soc. 66, 1276 (1944).

In general, no special precautions need to be taken in carrying out the dehydrohalogenation reaction using these reagents. The alkali metal adduct is highly colored and therefore acts as its own indicator to ensure that a sufficient amount is present for the dehydrohalogenation reaction. As one would expect, adding the halide to the complex ensures that an excess of the alkali metal adduct is present, thereby maximizing dehydrohalogenation and minimizing dehalogenation and therefore results in a lower halogen containing, more highly conjugated, unsaturated product. Furthermore, in this manner, if the halide is added dropwise, the color of the alkali metal complex will disappear instantly after sufficient halide has been added to react with all of the alkali metal in the complex.

Since the substituents present in the hexa-substituted phosphoric triamide do not enter into the production of the product, there is no reason to use any but those phosphoric triamides wherein the substituents are lower alkyl, i.e., are hexa-(lower alkyl)phosphoric triamides. Those which are liquids can also be used in excess as the reaction solvent. Since hexamethylphosphoric triamide is the most readily available, is a liquid and is admirably suited for the reaction, it is the preferred phosphoric triamide to use.

Other solvents can be used in conjunction with the phosphoric triamide, but offer no advantage and are usually disadvantageous. If a solvent is used it must be one of the solvents known to activate reactions of alkali metals, for example, compounds containing an ether oxygen, i.e., tetrahydrofuran, dimethoxyethane, etc. However, since such ether solvents are somewhat reactive with the alkali metal, sufficient additional alkali metal complex must be added when such solvents are used to compensate for the amount of alkali metal which reacts with the solvent. For example, I have found that when I used hexamethylphosphoric triamide to both complex the alkali metal and as the solvent that I only need to use the stoichiometric amount of 1 gram atom of alkali metal for each equivalent weight of halomethyl group present in the halo-containing reactant.

The reaction occurs so readily at room temperature that there is no advantage to be gained by carrying out the reaction at elevated or at reduced temperatures. The reaction is exothermic, and the exotherm can be permitted to raise the temperature of the reaction mixture above the ambient or room temperature. This exothermic reaction can be kept under control by several techniques, for example by controlling the rate of addition of either the halomethyl compound to the alkali metal complex or vice versa, by use of cooling coils, etc. When the addition of the one reactant to the other is completed, the reaction can be allowed to proceed for a longer period of time but such is not necessary. The polymer precipitates from the reaction mixture as it is formed, since it is insoluble in all ordinary solvents. It is readily removed from the balance of the reaction mixture. Although the product, as isolated, is extremely fluorescent, its fluorescent properties can be still further improved by extraction with boiling solvent vapors, for example in a Soxhlet apparatus using a polar solvent, for example acetone which extracts low molecular weight products which, although somewhat fluorescent, are not as brilliantly fluorescent as a higher molecular weight product and also some white crystalline material. However, when the alkali metal complex of a hexa-substituted phosphoric triamide is used, only very small amounts of such products are extracted, as compared to when other alkali metal types of dehydrohalogenating agents are used.

Any of the alkali metals can be used to form the complex with the hexa-substituted phosphoric triamide, i.e. lithium, sodium, potassium, rubidium, cesium, but I prefer to use lithium or sodium, preferably the latter which is the cheapest to use, since these two are the least hazardous of the alkali metals to use. The various halomethyl-substituted compounds having an arene nucleus which I may use are any of those disclosed in the prior art, such as that previously discussed which is incorporated by reference, and are preferably halomethyl-substituted aromatic compounds of the benzene series but may also be halomethyl-substituted compounds of the naphthalene, anthracene, or even higher series. Any of these arene compounds may be substituted with alkyl, aryl, halogen, alkoxy, etc., substituents as taught in the prior art.

Only two halomethyl groups need to be substituted on the aryl nucleus to produce an insoluble polymer. Since dihalomethyl compounds are more easily prepared than those having three or more halomethyl groups, there is really no reason to use other than dihalomethyl compounds although compounds having more than two halomethyl substituents can indeed be used, but offer no advantages over the products having two halomethyl groups. Furthermore, it is easier to have only two halomethyl groups on the arene nucleus so substituted that the double bonds of the vinylene groups created by the dehydrohalogenation reaction conjugated with each other through the double bonds of the aryl nucleus. Since the halogen is removed, there is no advantage to using other than chloromethyl substituents. However, the other halomethyl substituents can be used, e.g., bromomethyl, iodomethyl, etc.

In order that those skilled in the art may better understand my invention, the following examples are given by way of illustration and not by way of limitation. In all of the examples, percentages are by weight and temperatures are in degrees centigrade unless stated otherwise.

General procedure

The reaction vessel was equipped with a magnetic stirrer, addition funnel, reflux condenser and inlet for maintaining a nitrogen atmosphere within the vessel. All reagents were dried to ensure anhydrous reaction conditions. The alkali metal was added as a dispersion in mineral oil or liquid alkane. It was added to the phosphoric triamide and stirred until the complex had formed. The halomethylarene was then added dropwise causing a yellow precipitate to form almost instantaneously. Although an exothermic reaction occurs, cooling is not necessary since the rate of addition is sufficiently slow that no violent reaction occurs. The precipitate can be recovered immediately after the addition is complete by filtration but generally, the reaction mixture was allowed to stand, sometimes overnight previous to filtering the product from the reaction mixture. After washing with water, the product was extracted first with water and then with acetone in a Soxhlet apparatus. The theoretical yields given in parentheses is based on complete dehydrohalogenation.

EXAMPLE 1

Using the general procedure, 5.85 g. of a 40% dispersion of sodium in mineral oil was complexed in 50 ml. of hexamethylphosphoric triamide and a solution of 8.65 g. of $\alpha,\alpha'$-dichloro-p-xylene in 50 ml. of hexamethylphosphoric triamide was added. After extraction with water, the product weighed 6.0 g. and after acetone extraction the product weighed 4.7 g. (92.2%) and had a very brilliant yellow color. Residual chlorine content was 3.2%. Based on this analysis and assuming that the chlorine was chloromethyl end groups, the polymer would have 21 repeating units in the polymer molecule. When exposed to ultraviolet light, it absorbs throughout the ultraviolet range with maxima at 260, 265 and 275 m$\mu$ with tailing off to 525 m$\mu$. When using either 2537 or 3650 A. light, the emission maximum is at 530 m$\mu$.

EXAMPLE 2

Using the general procedure, 11.15 g. of a 40% dispersion of sodium was complexed with 30 ml. of hexamethylphosphoric triamide in the presence of 150 ml. of tetrahydrofuran as a complexing solvent. To this complex, 17.5 g. of $\alpha,\alpha'$-dichloro-p-xylene dissolved in 50 ml. of tetrahydrofuran was added slowly. The yield was 4.75 g. (47%) of a yellow fluoresecnt product.

EXAMPLE 3

Example 2 was repeated using 4 times the quantity of reactants and maintaining the reaction temperature below 20° C. by use of an ice bath surrounding the reactor. Any excess sodium was destroyed by adding methanol to the reaction mixture. There was obtained 26.7 g. (65.5%) of the bright yellow phosphor having a residual chlorine content of 2.8%.

EXAMPLE 4

When Example 2 was repeated, except using 2.76 g. of a 50% by weight dispersion of lithium in mineral oil, there was obtained a 6.2 g. (60.7%) of the bright yellow phosphor having a residual chlorine content of 0.1%.

EXAMPLE 5

When Example 2 was repeated, using 26 g. of a 30% dispersion of potassium in mineral oil, there was obtained 7.0 g. (68.6%) of the bright yellow phosphor having a residual chlorine content of 1.4%.

EXAMPLE 6

Example 2 was repeated except 16.5 g. of sodium dispersion in mineral oil was used (a 50 mole percent excess). There was obtained 9.0 g. (89.3%) yield of the bright yellow phosphor having a residual chlorine content of 1.6%. The much higher yield of this example over that obtained in Example 2 shows the advantage of using an excess of sodium when an activating solvent, such as tetrahydrofuran, is used which is somewhat reactive with an alkali metal.

EXAMPLE 7

Example 2 was repeated except other materials known to form complexes with alkali metals were substituted for the hexamethylphosphoric triamide. When biphenyl was used, a product was obtained having greater than 10% chlorine and although the product was fluorescent it was not anywhere nearly as fluorescent as the product obtained in Example 2. When naphthalene was used, a product having a low chlorine conent (2.6%) was obtained. However, it was a white polymeric product and showed no fluorescence when irradiated with ultraviolet light. When benzophenone was used, a low chlorine content product was likewise obtained (1.8%). However, it was also white in color and showed no appreciable fluorescence when irradiated with ultraviolet light.

In the same manner as set forth in the above examples, the other alkali metals can be used in place of the sodium, potassium and lithium specifically used above. Likewise, other hexa-substituted phosphoric triamides, for example hexaethylphosphoric triamide, hexapropylphosphoric triamide, hexaisobutylphosphoric triamide, hexaoctylphosphoric triamide, etc., can be used in place of the hexamethylphosphoric triamide. In place of chloromethyl-substituted compounds, bromomethyl and iodomethyl-substituted compounds can be used.

As mentioned previously, the phophors produced by my process can be used to impart fluorescent properties to various polymeric compositions, either as paints, lacquers, varnishes, or as molding compositions. These fluorescent compositions can be used for decorative or utilitarian purposes in the same manner as oragnic phosphors known in the art. It will also be apparent that various modifications can be made in this invention without departing from the spirit or scope thereof. These and other variations are within the intended scope of the invention as set forth in the following claims.

What I claim as new and desire to secure by Letters Patent of the United States is:

1. In the process for making a bright yellow, fluorescent polymer by dehydrohalogenating with a dehydrohalogenating agent under dehydrohalogenating conditions, a compound having at least two halomethyl groups substituted on an aryl nucleus in positions relative to each other so that the double bonds of the vinylene groups created by said dehydrohalogenating reaction are conjugated with one another through the double bonds of said aryl nucleus, the improvement wherein said dehydrohalogenating agent is an alkali metal complex of a hexa-(lower alkyl)phosphoric triamide.

2. The improvement as in claim 1, wherein the alkali metal is sodium.

3. The improvement as in claim 1, wherein the phosphoric triamide is hexamethylphosphoric triamide.

4. The improvement as in claim 1, wherein the dehydrohalogenating agent is the sodium complex with hexamethylphosphoric triamide.

5. The improvement as in claim 1, wherein the compound which is dehydrohalogenated is a bis(halomethyl)benzene.

6. The improvement as in claim 1, wherein the compound which is dehydrohalogenated is a bis(chloromethyl)benzene.

7. The improvement as in claim 6, wherein the bis(chloromethyl)benzene is $\alpha,\alpha'$-dichloro-p-xylene.

8. The improvement as in claim 1, wherein the compound which is dehydrohalogenated is $\alpha,\alpha'$-dichloro-p-xylene and the phosphoric triamide is hexamethylphosphoric triamide.

9. The improvement of claim 1, wherein the compound dehydrohalogenated is $\alpha,\alpha'$-dichloro-p-xylene and the dehydrohalogenating agent is the sodium complex of hexamethylphosphoric triamide.

References Cited

UNITED STATES PATENTS

| | | | |
|---|---|---|---|
| 3,110,687 | 11/1963 | Smith | 260—2 |
| 3,427,261 | 2/1969 | Meyer | 260—2 |

SAMUEL H. BLECH, Primary Examiner

U.S. Cl. X.R.

252—301.2; 260—551 P, 649 R